United States Patent
Walcher et al.

(10) Patent No.: US 11,400,523 B2
(45) Date of Patent: Aug. 2, 2022

(54) DRILLING TOOL

(71) Applicant: CERATIZIT BALZHEIM GMBH & CO. KG, Balzheim (DE)

(72) Inventors: Rainer Walcher, Balzheim (DE); Jochen Walcher, Balzheim (DE); Matthias Walcher, Balzheim (DE); Oliver Rapp, Balzheim (DE)

(73) Assignee: CERATIZIT BALZHEIM GMBH & CO. KG, Balzheim (DE)

( * ) Notice: Subject to any disclaimer, the term of this patent is extended or adjusted under 35 U.S.C. 154(b) by 357 days.

(21) Appl. No.: 16/496,538

(22) PCT Filed: Mar. 8, 2018

(86) PCT No.: PCT/EP2018/055786
§ 371 (c)(1),
(2) Date: Sep. 23, 2019

(87) PCT Pub. No.: WO2018/172097
PCT Pub. Date: Sep. 27, 2018

(65) Prior Publication Data
US 2020/0376570 A1    Dec. 3, 2020

(30) Foreign Application Priority Data
Mar. 22, 2017    (AT) .................................. A 60/2017

(51) Int. Cl.
*B23B 51/02*    (2006.01)

(52) U.S. Cl.
CPC ........ *B23B 51/02* (2013.01); *B23B 2251/043* (2013.01); *B23B 2251/443* (2013.01)

(58) Field of Classification Search
CPC .............. B23B 2251/408; B23B 51/02; B23B 2251/043; B23B 2251/443; B23B 2251/44; Y10T 408/9097
See application file for complete search history.

(56) References Cited

U.S. PATENT DOCUMENTS

| 2,008,031 | A | * | 7/1935 | Miltner | ................... | B23B 51/02 408/56 |
| 6,210,083 | B1 | | 4/2001 | Kammermeier et al. | | |

(Continued)

FOREIGN PATENT DOCUMENTS

| DE | 102012002050 A1 | 8/2012 |
| DE | 102012112781 A1 | 6/2014 |

(Continued)

*Primary Examiner* — Boyer D Ashley
*Assistant Examiner* — Reinaldo A Del Vargas Rio
(74) *Attorney, Agent, or Firm* — Laurence A. Greenberg; Werner H. Stemer; Ralph E. Locher

(57) ABSTRACT

A drilling tool, in particular a spiral drill, has a drill longitudinal axis, at least two flutes extending at a twist angle with respect to the drill longitudinal axis, webs formed between the flutes, and lands formed on a lateral surface of the webs. Guide rings are at least partially formed on the lands. The guide rings extend at an angle different from the twist angle to the drill longitudinal axis. At least one guide chamfer is formed on at least one land in addition to the guide rings. The guide chamfer extends parallel to the twist angle and in front of the guide rings with respect to the direction of rotation of the drilling tool.

10 Claims, 1 Drawing Sheet

(56) References Cited

U.S. PATENT DOCUMENTS

| | | | |
|---|---|---|---|
| 9,539,653 B2 | 1/2017 | Rogalla et al. | |
| 2009/0277691 A1* | 11/2009 | Geier | E21B 10/445 |
| | | | 175/394 |
| 2013/0058734 A1 | 3/2013 | Volokh | |

FOREIGN PATENT DOCUMENTS

| | | |
|---|---|---|
| FR | 1274316 A | 9/1961 |
| WO | 9703792 A1 | 2/1997 |

* cited by examiner

DRILLING TOOL

BACKGROUND OF THE INVENTION

Field of the Invention

The invention relates to a drilling tool, in particular a spiral drill. The drill has a drill longitudinal axis, at least two flutes extending in a manner twisted at a twist angle with respect to the drill longitudinal axis, webs formed between the flutes, and lands formed on a lateral surface of the webs. Guide rings are at least partially formed on the lands and they extend at an angle other than the twist angle to the drill longitudinal axis.

Drilling tools of the generic type have a shank portion and a cutting edge portion. The cutting edge portion generally bears two helical flutes that serve to transport away chips and allow coolant and/or lubricant to be fed to the hole bottom.

Located between each of the flutes is a web, the lateral surface of which forms a land.

It is known practice to form guide chamfers on the land, which have an inclination angle other than the twist angle of the flutes with respect to a drill longitudinal axis, with the result that these guide chamfers are formed as rings or ring segments on the land.

Thus, for example FR1274316 shows such a drilling tool with guide chamfers in the form of rings.

However, a drawback of guide rings is that chips can be drawn in between the land and drilled hole.

Furthermore, it is known practice to equip drilling tools with internal coolant passages. Via such cooling passages, which usually extend in a twisted manner, coolant and/or lubricant can be delivered directly to the main cutting edges.

SUMMARY OF THE INVENTION

The object of the present invention is to specify an improved drilling tool.

This object is achieved by a drilling tool having the features as claimed. Advantageous developments are specified in the dependent claims.

Since at least one guide chamfer extending parallel to the twist angle and in front of the guide rings with respect to the direction of rotation of the drilling tool is formed on at least one land, in addition to the guide rings, chips are prevented from being drawn in between the land and drilled hole. In addition, compared with the prior art, according to which the guide rings extend as far as the secondary cutting edge, a much cleaner cut is created. This is because, when the guide rings extend as far as the secondary cutting edge, the secondary cutting edge has a toothed contour. In the case of a drilling tool according to the invention, the guide rings do not enter into cutting engagement. As a result of the secondary cutting edge not being toothed according to the invention, a smooth cut takes place.

The term "guide rings" does not mean that the rings are closed rings in the geometric sense, rather they are ring segments which extend on the lands.

"Extending parallel to the twist angle" means that the guide chamfer extends parallel to a cutting edge along the land.

Preferably, the guide chamfer is spaced apart from the guide rings by a groove extending parallel to the guide chamfer. In addition to advantages from a manufacturing point of view, such a groove creates the possibility of transporting coolant and/or lubricant from a drill head to the guide rings. This brings about reduced friction of the drilling tool in a drilled hole.

Expediently, the guide rings are formed along a guide portion with respect to the drill longitudinal axis, the length of said guide portion being at least twice the drill diameter. For straightforward guidance of the drilling tool, it is been found to be advantageous to form the guide rings at least over this section.

Preferably, the length of the guide portion is less than or equal to five times the drill diameter. Greater than this length, there is no advantage to the formation of guide rings, especially since the drilling tool generally has a taper in the direction of a clamping portion.

Preferably, the angle of the guide rings to the drill longitudinal axis is greater than the twist angle of the drilling tool. This is advantageous, inter alia, with regard to friction, because the length of the guide rings is shortened as a result.

Preferably, the guide rings extend at an angle of $\geq 80°$ to the drill longitudinal axis, more preferably $\leq 90°$, particularly preferably $90°$ to the drill longitudinal axis. This results in particularly straightforward guidance of the drilling tool with low friction. From a manufacturing point of view, $90°$ is particularly easy to realize. Furthermore, it has been shown that, at $90°$, coolant and/or lubricant is transported in the guide rings with particularly low resistance. The favorable aspect of an angle of $\geq 80°$ to the drill longitudinal axis, more preferably $\leq 90°$, particularly preferably $90°$, is that the coolant and/or lubricant tends to be held in a front (working-side) region of the drill, where good cooling and lubrication are particularly important.

Preferably, the guide rings are formed such that a profile width of the guide rings is between 20% and 40% of a profile unit.

A profile width is understood to be the width of a guide ring at the (nominal) diameter of the drilling tool, that is to say that width of a guide ring at which the guide ring bears against the drilled hole.

A profile unit is understood to be the smallest repeat unit of the profile formed by the guide rings, formed by the actual raised guide ring and a ring groove adjoining the latter.

When the profile width of the guide rings is between 20% and 40% of a profile unit, a particularly well-balanced ratio of guidance and friction is achieved. In other words, between 20% and 40% of that lateral surface of the drilling tool on which guide rings are formed is then in contact with the drilled hole.

Preferably, at least one internal coolant passage is formed in the drilling tool. As a rule, the coolant passage is located in a web and follows the twist angle of the drilling tool. This creates the possibility of delivering coolant and/or lubricant to the drill head. Particularly advantageously, in combination with the abovementioned groove between the guide rings and guide chamfer, coolant and/or lubricant can now be transported to the guide rings.

The invention is explained in more detail in the following text by way of figures, in which:

DESCRIPTION OF THE INVENTION

Figure 1:
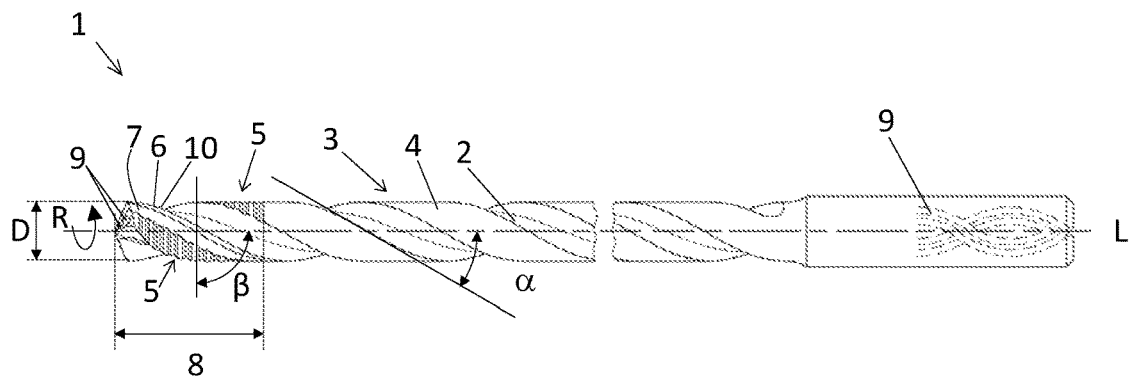
FIG. 1 shows a drilling tool according to the invention

FIG. 1 shows a first exemplary embodiment of a drilling tool 1. The drilling tool 1 has a drill diameter D and is intended to operate in a direction of rotation R. The present drilling tool 1 is thus right-handed. The invention can of course also be applied to left-handed tools.

The drilling tool 1 has flutes 2 that extend in a manner twisted at a twist angle α to a drill longitudinal axis L, and webs 3 located between the flutes 2. An outer lateral surface of the webs 3 forms the land 4. Along a guide portion 8, guide rings 5 are formed on the land 4. The guide rings 5 extend at an angle β to the drill longitudinal axis L. The angle β of the guide rings 5 is greater than the twist angle α and is exactly 90° in the present exemplary embodiment. The twist angle α measures 30° in the present exemplary embodiment.

The angles are determined between a tangent to the land 4 and the drill longitudinal axis L and between a tangent to a guide ring 5 and the drill longitudinal axis L, respectively, as is shown in the figure.

In a drilled hole (not shown), the drilling tool 1 can be supported via the guide rings 5. With regard to friction, support via guide rings 5, with an equally good supporting action and guidance, is more favorable than full support via the land 4.

The length of the guide portion 8 is preferably at least twice the drill diameter D and is preferably less than or equal to five times the drill diameter D.

In the present exemplary embodiment, a guide chamfer 6 is formed between a secondary cutting edge 10 and the guide rings 5. This guide chamfer 6 prevents chips from being drawn in between the drilled hole and land 4. Furthermore, a groove 7 is provided between the guide chamfer 6 and the guide rings 5. By way of this groove 7, coolant and/or lubricant can be passed from the drill head to the guide rings 5. This results in reduced friction between the guide rings 5 and the drilled hole.

Here, the drilling tool 1 also has internal coolant passages 9, which extend in the webs 3 and emerge at the drill head. As a result of this measure, the feed of coolant and/or lubricant to the drill head and subsequently to the guide rings 5 can be realized in a particularly advantageous manner.

Figure 2:
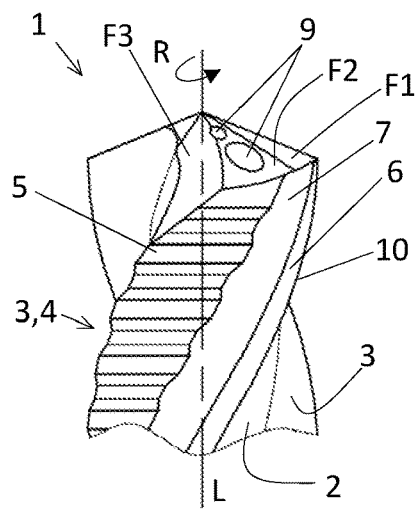
FIG. 2 shows a detail of the drilling tool

FIG. 2 shows a side view of a front portion of the drilling tool 1 in detail. The intended direction of rotation R is again indicated by an arrow.

Formed on lands 4 are guide rings 5. Formed between the guide chamfer 6 and the guide rings 5 is the groove 7.

The guide chamfer 6 extends along (parallel to) the secondary cutting edge 10.

Outlet openings of the coolant passages 9 are apparent at a working-side end of the drilling tool 1 (at the drill head). The working-side end is understood to be the direction facing a workpiece during machining.

Thus, in a particularly advantageous manner, coolant and/or lubricant can be transported to the guide rings 5 via the groove 7. Also illustrated are a first flank F1, a second flank F2 and a third flank F3 of the front end. The guide rings 5 start in the second flank F2 in the present exemplary embodiment.

Figure 3:
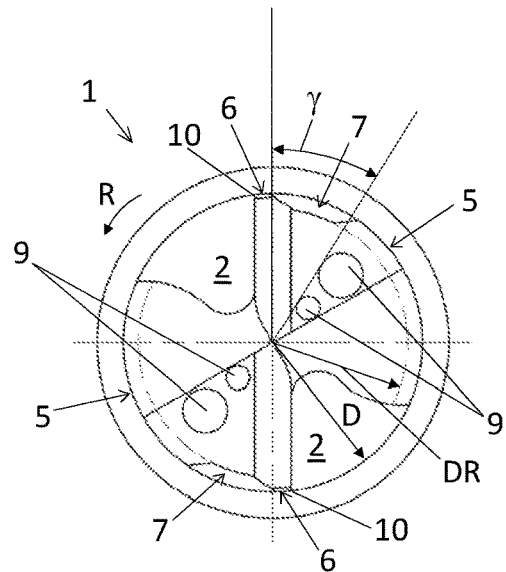
FIG. 3 shows an end-on view of the drilling tool

FIG. 3 shows an end-on view of the drilling tool 1.

The guide chamfer 6 is formed behind or after the secondary cutting edges 10 with regard to the direction of rotation R. Said guide chamfer 6 prevents chips from being drawn in between the land 4 or the guide rings 5 formed on the land 4 and the drilled hole. Formed between the guide chamfer 6 and the guide rings 5 is the groove 7. The drilling tool 1 has a drill diameter D and a cleared diameter DR. The groove 7 extends as far as the cleared diameter DR. The groove 7 extends through a groove angle γ of in this case around 30°. In this way, a sufficiently large groove cross section is created to ensure transport of coolant and/or lubricant to the guide rings 5. Coolant and/or lubricant can emerge via outlet openings of the coolant passages 9 and be transported to the guide rings 5 via the groove 7. That part of the land 4 that bears the guide rings 5 extends through an angular range of about 90°, resulting in very good guidance of the drilling tool 1.

In the exemplary embodiment discussed above, in each case two flutes 2 and accordingly two spiral webs 3 are formed. The invention is of course not limited to this number of flutes and spiral webs.

Figure 4:
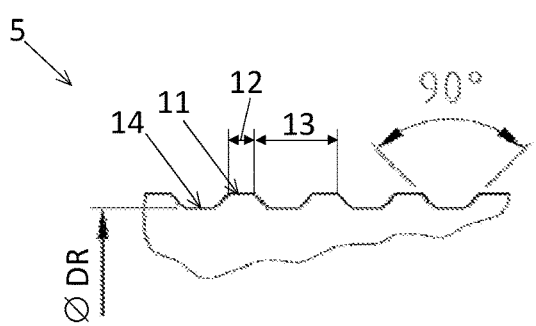
FIG. 4 shows guide rings in detail

FIG. 4 shows a profile of the guide rings 5 in a cross section along the longitudinal axis L of the drilling tool 1.

In detail, the guide rings 5 comprise a guide face 11 having a profile width 12, which guide face 11 forms that part of a guide ring 5 that is in contact with the drilled hole, and an in this case trapezoidal ring groove 14, which extends as far as the cleared diameter DR of the drilling tool 1.

Preferably, the guide rings 5 are formed such that the profile width 12 of the guide rings 5 is between 20% and 40% of the width of a profile unit 13. The profile unit 13 is the smallest repeat unit of the profile formed by the guide rings 5.

When the profile width 12 of the guide rings is between 20% and 40% of a profile unit 13, a particularly well-balanced ratio of guidance and friction is achieved.

Figure 5:
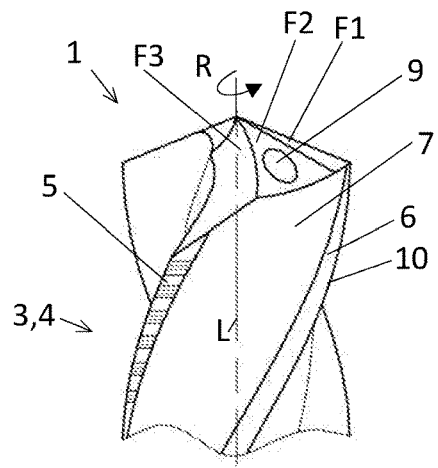
FIG. 5 shows a further exemplary embodiment of a drilling tool.

FIG. 5 shows a side view of a further exemplary embodiment of a drilling tool 1. In this case, the guide rings 5 are formed in a narrow segment of the land 4. That part of the land 4 that bears the guide rings 5 starts only at a third flank F3 of the front end. By contrast, the groove 7 is very wide and covers the majority of the land 4. By comparison, the guide rings 5 in the exemplary embodiment in FIG. 2 already start in a second flank F2.

In a side view similar to FIG. 3, this would result, for this exemplary embodiment, in a groove angle γ of around 90°, while that part of the land 4 that bears guide rings 5 extends only through a small angular range of for example 20-30°. The exemplary embodiment is intended to show that the angle ratios (with regard to an end-on view) through which the groove 7 and the guide rings 5 extend can be very different. In the present exemplary embodiment, the guidance by the guide rings 5 commences relatively late—namely at the third flank F3—but in return the friction caused by the guide rings 5 is particularly low.

LIST OF REFERENCE SIGNS USED

1 Drilling tool
2 Flute
3 Spiral web
4 Land
5 Guide ring
6 Guide chamfer
7 Groove
8 Guide portion
9 Coolant passage
10 Secondary cutting edge
11 Guide face
12 Profile width 13 Profile unit
14 Ring groove
F1, F2, F3 Flanks
L Drill longitudinal axis
D Drill diameter
DR Cleared diameter
R Direction of rotation

The invention claimed is:

1. A drilling tool, comprising:
a drill longitudinal axis;
at least two flutes extending twisted at a twist angle with respect to the drill longitudinal axis;
webs formed between said at least two flutes;
lands formed on a lateral surface of said webs;
guide rings formed at least in sections on said lands, said guide rings extending at an angle different from the twist angle to the drill longitudinal axis;
at least one guide chamfer formed on at least one of said lands, extending parallel to the twist angle and in front of said guide rings with respect to a direction of rotation of the drilling tool, said guide chamfer being spaced apart from said guide rings by a groove extending parallel to said guide chamfer.

2. The drilling tool according to claim 1, wherein said guide rings are formed along a guide portion with respect to the drill longitudinal axis, and a length of said guide portion is at least twice a drill diameter.

3. The drilling tool according to claim 2, wherein the length of the guide portion is less than or equal to five times the drill diameter.

4. The drilling tool according to claim 1, wherein the angle of the guide rings relative to the drill longitudinal axis is greater than the twist angle.

5. The drilling tool according to claim 1, wherein said guide rings extend at an angle of ≥80° relative to the drill longitudinal axis.

6. The drilling tool according to claim 5, wherein the angle of said guide rings relative to the drill longitudinal axis is ≤90°.

7. The drilling tool according to claim 5, wherein the angle of said guide rings relative to the drill longitudinal axis equals 90°.

8. The drilling tool according to claim 1, wherein said guide rings are formed with a profile width between 20% and 40% of a length of a profile unit.

9. The drilling tool according to claim 1, wherein at least one internal coolant passage is formed in the drilling tool.

10. The drilling tool according to claim 1, configured as a spiral drill.

* * * * *